United States Patent [19]

Hawley et al.

[11] Patent Number: 5,091,490

[45] Date of Patent: Feb. 25, 1992

[54] OLEFIN POLYMERIZATION CATALYSTS AND METHODS

[75] Inventors: Gil R. Hawley, Dewey, Okla.; Simon G. Kukes, Naperville, Ill.; Robert L. Banks, deceased, late of Bartlesville, Okla., by Mildred L. Banks, administratrix

[73] Assignee: Phillips Petroleum Company, Bartlesville, Okla.

[21] Appl. No.: 717,903

[22] Filed: Jun. 19, 1991

[51] Int. Cl.$^5$ ................................................. C08F 4/44
[52] U.S. Cl. ...................................... 526/97; 502/113; 502/104; 502/110; 526/125
[58] Field of Search ........................... 526/97; 502/113

[56] References Cited

U.S. PATENT DOCUMENTS

| | | | |
|---|---|---|---|
| 4,173,547 | 11/1979 | Graff | 252/429 B |
| 4,284,748 | 8/1981 | Welch | 526/119 |
| 4,391,736 | 7/1983 | Capshew | 252/429 B |
| 4,394,291 | 7/1983 | Hawley | 252/429 B |
| 4,477,588 | 10/1984 | Hawley | 502/119 |
| 4,565,795 | 1/1986 | Short et al. | 502/110 |
| 4,618,595 | 10/1986 | Dietz | 502/108 |
| 5,024,982 | 6/1991 | Hawley et al. | 502/110 |

Primary Examiner—Joseph L. Schofer
Assistant Examiner—David Wu
Attorney, Agent, or Firm—Laney, Dougherty, Hessin & Beavers

[57] ABSTRACT

Silica supported high activity olefin polymerization catalysts, methods of producing the catalysts and methods of using the catalysts in the polymerization of olefins are provided. The methods of producing the catalysts each basically comprise contacting a particulate silica support impregnated with tungsten oxide with the soluble complex produced by heating a mixture of a metal dihalide with a transition metal compound to produce a solid, and then reacting the solid with an organoaluminum halide. The catalysts produced have improved productivities and are less soluble in polymerization media.

28 Claims, No Drawings

OLEFIN POLYMERIZATION CATALYSTS AND METHODS

BACKGROUND OF THE INVENTION

1. Field of the Invention

The present invention relates to olefin polymerization catalysts and methods of producing and using the catalysts, and more particularly, to silica supported olefin polymerization catalysts prepared from mixtures of transition element compounds and organometallic compounds.

2. Description of the Prior Art

It is known to polymerize α-olefins and mixtures thereof at low pressures with coordination catalysts prepared from mixtures of transition element compounds and organometallic compounds.

In the polymerization of ethylene and propylene, it is desirable to perform the polymerization reaction in an inert diluent at a temperature at which the resulting polymer or copolymer is relatively insoluble in the reaction medium. Also, it is desirable that the polymer so produced does not require additional processing to remove catalyst residue therefrom. In order to achieve the foregoing, a polymerization catalyst must be employed which is capable of producing polymer in a high productivity whereby the residual catalyst level in the recovered polymer is maintained at a very low level. It is also desirable that the catalyst bring about the production of polymer particles which are characterized by strength, uniformity of size, and a relatively low level of fine particulate material.

Olefin polymerization catalysts of the type described above prepared from mixtures of transition elements and organometallic compounds have been developed and utilized which achieve, in varying degrees, the desired results described above. For example, U.S. Pat. No. 4,394,291 issued July 19, 1983 discloses an olefin polymerization catalyst prepared by reacting a metal dihalide with one or more transition metal compounds and reacting that product with a certain organoaluminum compound. The resulting catalyst, with or without a cocatalyst, achieves high enough productivity that catalyst residue contained in the produced polymer is low enough to not significantly affect the polymer properties.

U.S. Pat. No. 4,719,271 issued Jan. 12, 1988 discloses a polymerization catalyst similar to that described above, i.e., a catalyst prepared by reacting a metal dihalide with a transition metal compound and reacting that product with an organoaluminum compound. The catalyst is prepared in the presence of a particulate diluent, e.g., polymeric fibrils.

U.S. patent application Ser. No. 07/284,280 filed Dec. 14, 1988 and assigned to the assignee of this present invention discloses yet another coordination catalyst prepared by contacting a soluble complex produced by contacting a metal dihalide with a transition metal compound in the presence of particulate silica. The resulting silica supported complex is contacted with an organoaluminum halide to produce a high activity olefin polymerization catalyst.

Thus, there has been and continues to be a search for catalysts useful in the polymerization of α-olefins which result in high polymer productivity and produced polymers having high strength, a uniformity of size, and a relatively low level of catalyst residue therein. By the present invention, improved silica supported high activity olefin polymerization catalysts, methods of producing the catalysts and methods of using the catalysts are provided which achieve superior results in the above described areas.

SUMMARY OF THE INVENTION

In accordance with the present invention, an improved silica supported high activity olefin polymerization catalyst is produced by first preparing a particulate silica support impregnated with tungsten oxide. The tungsten oxide impregnated silica support is then contacted with the soluble complex produced by heating a mixture of a metal dihalide with at least one transition metal compound in the presence of a diluent. The contact produces a solid which is in turn contacted with an organoaluminum halide to produce the catalyst.

The particulate tungsten oxide impregnated silica support is preferably prepared by mixing particulate silica with an aqueous solution of ammonium metatungstate, drying the mixture and then calcining the resulting impregnated silica. The amount of ammonium metatungstate utilized is such that the resulting calcined silica contains tungsten oxide in an amount in the range of from about 1% to about 20% by weight of the impregnated support.

The soluble complex with which the impregnated silica support is contacted is preferably produced by heating a mixture of magnesium dichloride with a titanium alkoxide and phenol in xylene. After the support is contacted with the complex to produce a solid, the solid is preferably contacted with ethylaluminum sesquechloride to produce the catalyst. In a preferred method, the catalyst is additionally contacted with an activating agent selected from the group consisting of a titanium halide, a silicon halide, a halogenated silane and mixtures of the titanium halide with one or more of the silicon compounds.

Catalysts prepared in accordance with the above described method, and methods of polymerizing olefins utilizing the catalysts are also provided by the present invention. In a preferred method of polymerizing olefins with a catalyst of this invention, a cocatalyst is utilized therewith, preferably a cocatalyst comprising triethylaluminum.

It is, therefore, a general object of the present invention to provide improved olefin polymerization catalysts and methods of producing and using such catalysts.

A further object of the present invention is the provision of improved silica supported high activity olefin polymerization catalysts which have high olefin polymer productivity and result in polymers having high strength, uniformity of size and a low level of residual catalyst Other and further objects, features and advantages of the present invention will be readily apparent to those skilled in the art upon a reading of the description of preferred embodiments which follows.

DESCRIPTION OF PREFERRED EMBODIMENTS

The catalyst of the present invention comprises a solid complex resulting from the chemical combination of a metal dihalide and at least one transition metal compound. The solid complex is deposited on a particulate tungsten oxide impregnated silica support and further reacted with an organoaluminum halide.

The catalyst is produced by preparing a particulate silica support impregnated with tungsten oxide; contacting the support with the soluble complex produced by heating a mixture of a metal dihalide with at least one transition metal compound in the presence of a diluent to produce a solid, the support being present in an amount in the range of from about 0.1% to about 30% by weight based on the weight of the soluble complex; and then contacting the solid produced with an organoaluminum halide in an amount in the range of from about 0.1 mole to about 10 moles per mole of transition metal compound in the solid to produce the catalyst.

The tungsten oxide impregnated silica support is preferably prepared by mixing particulate silica with an aqueous solution of ammonium metatungstate whereby the silica is impregnated with the ammonium metatungstate. The water and other volatiles are then removed from the mixture such as by means of an air circulating oven heated to about 100° C. After drying, the impregnated silica is calcined to convert the ammonium metatungstate to tungsten oxide. The calcining step can be carried out in air at an elevated temperature, e.g., 500° C. for a time period in the range of from about 2 to 6 hours.

In addition to the metal dihalide and at least one transition metal compound utilized for forming the solid complex deposited on the silica support, a third component can be included to provide increased productivity and/or greater selectivity. Also, after being contacted with the organoaluminum halide, the solid catalyst formed can be reacted with one or more halogen containing compounds.

The metal dihalide utilized is preferably selected from compounds containing metals of Groups IIA and IIB of the Periodic Table. Examples of such metals are beryllium, magnesium, calcium, and zinc. Magnesium dichloride is presently preferred because it is readily available, inexpensive and provides excellent results. While both the hydrous and anhydrous forms of the metal dihalide can be employed in accordance with the present invention, it is desirable that the amount of water in the metal dihalide be from 0.5 to 1.5 moles per mole of metal dihalide prior to contacting the metal dihalide with the transition metal compound. Methods known to those skilled in the art can be utilized to limit the amount of water to an amount within the range given above. If anhydrous metal dihalide is utilized, it is preferred that an appropriate amount of water is mixed with the anhydrous metal dihalide prior to contacting the transition metal compound therewith.

The metal dihalide component is preferably in particulate solid form to facilitate its reaction with the transition metal compound. Various conventional techniques for converting a solid metal dihalide compound to fine particulate form can be utilized, such as roll milling, reprecipitating, etc.

The transition metal compounds which are useful in accordance with this invention are those wherein the transition metal is selected from the groups IVB and VB of the Periodic Table, and the transition metal is bonded to at least one atom selected from the group consisting of oxygen, nitrogen and sulfur with the oxygen, nitrogen and sulfur radical. The transition metal is preferably selected from titanium, zirconium and vanadium. Excellent results have been obtained with titanium compounds and they are therefore preferred. Examples of such compounds which can be used in accordance with this invention are titanium tetrahydrocarbyloxides, titanium tetraimides, titanium tetraamides and titanium tetramercaptides. Other transition metal compounds which can be used include, for example, zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

Titanium tetrahydrocarbyloxides are presently preferred because they produce excellent results and are readily available. Preferred titanium tetrahydrocarbyloxide compounds include those represented by the general formula Ti(OR)$_4$ wherein each R is individually selected from alkyl, cycloalkyl, aryl, alkaryl, and aralkyl hydrocarbon radicals containing from about 1 to about 20 carbon atoms, and each R can be the same or different. Titanium tetrahydrocarbyloxides in which the hydrocarbyl group contains from about 1 to about 10 carbon atoms per radical are more frequently employed because they are more readily available. Suitable titanium tetrahydrocarbyloxides include, for example, titanium tetramethoxide, titanium dimethoxidediethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-toluyloxide and titanium tetraphenoxide. Of these, titanium tetraalkoxides are generally preferred, and titanium tetra-n-butoxide is particularly preferred because of the excellent results obtained.

The mole ratio of the transition metal compound to the metal dihalide compound can vary over a relatively broad range. Generally, the mole ratio is within the range of about 10:1 to about 1:10. The most commonly used mole ratio is within the range of from about 2:1 to about 1:2. When the titanium compound is a titanium tetrahydrocarbyloxide and the metal dihalide is magnesium dihalide, a mole ratio of titanium to magnesium of about 1:2 is preferred.

The metal dihalide compound and the transition metal compound employed in the present invention are normally mixed together and heated by, e.g., refluxing, in a suitable dry solvent or diluent that is essentially inert to the reactants and product. Suitable inert solvents or diluents include, for example, n-pentane, n-heptane, methylcyclohexane, toluene, xylenes and the like. Aromatic solvents, such as xylene, are preferred because the solubilities of the metal dihalide compound and transition metal compound are higher in aromatic solvents than aliphatic solvents, particularly at low mixing temperatures.

The amount of diluent employed can also vary over a broad range. Usually, the diluent is present in an amount in the range of from about 20 cc to about 100 cc per gram of metal dihalide utilized. The temperature to which the metal dihalide, transition metal compound and diluent mixture is heated is normally within the range of from about 15° C. to about 150° C. when the heating is carried out at atmospheric pressure. Higher heating temperatures and pressures above atmospheric can be employed. The time over which the mixture is heated generally varies within the range of from about 5 minutes to about 10 hours. In most instances, a time within the range of from about 15 minutes to about 3 hours is sufficient. Following the heating step, the resulting mixture containing a dissolved reaction complex can be filtered to remove any undissolved material if desired.

As mentioned above, in a preferred embodiment of the present invention, a third component in addition to the metal dihalide and transition metal compound is included in the reaction mixture. The third component can be a single compound or a mixture of compounds to provide improvements in productivity or selectivity as desired. Examples of compounds that can be used as a third component are electron donors such as ammonia, hydroxylamine, alcohols, ethers, carboxylic acids, esters, acid chlorides, amides, nitriles, amines, and substituted and unsubstituted phenols, naphthols and their sulfur-containing analogs, i.e., thiophenols. The preferred such compounds are aromatic compounds selected from the group consisting of phenols, thiophenols, naphthols, aralkyl alcohols, aromatic acids, and aromatic esters. Of these, a phenol or aromatic ester or both are preferred. The mole ratio of the third component employed relative to the transition metal compound can vary from about 5:1 to about 1:5, preferably a mole ratio of third component to transition metal compound of about 1:1 to 2:1 is employed.

The metal dihalide compound, transition metal compound and optional third component compound or compounds can be reacted in a solvent or diluent as described above, or, when one or more of the reactant compounds are in the liquid state during the reaction, the use of a solvent or diluent can be omitted.

As mentioned, the reaction of the metal dihalide compound, transition metal compound and optionally, a third component, produces a soluble complex which is dissolved in the liquid component or diluent present. To the solution containing the soluble complex is added previously prepared particulate silica impregnated with tungsten oxide. While the tungsten oxide impregnated silica support can be prepared using various techniques, a preferred such technique is to mix particulate silica material having a particle size in the range of from about 20 to about 50 microns with an aqueous solution of ammonium metatungstate. The ammonium metatungstate can be present in the aqueous solution in an amount in the range of from about 0.5% to about 25% by weight of the solution, and the mixture of the aqueous ammonium metatungstate solution and silica is shaken or stirred to uniformly impregnate the silica with the ammonium metatungstate. The amount of particulate silica added to the aqueous ammonium metatungstate solution is such that the resulting impregnated silica contains ammonium metatungstate in an amount in the range of from about 1% to about 20% by weight of the impregnated silica, preferably 6% by weight. The impregnated silica is separated from the aqueous solution and dried such as by heating to about 100° C. in an air circulating oven. The dried composition is then calcined in air at a temperature in the range of from about 200° C. to about 800° C. for a time period of from about 3 hours to about 6 hours to produce the tungsten oxide impregnated silica.

The amount of the tungsten oxide impregnated silica contacted with the soluble complex produced by heating a mixture of metal dihalide, transition metal compound, and optionally a third component, is in the range of from about 0.1% to about 30% by weight based on the weight of the soluble complex present. Preferably, the weight of the titanium oxide impregnated silica employed is about 20% of the soluble complex.

The tungsten oxide impregnated particulate silica is preferably added directly to the soluble reaction complex of metal dihalide, transition metal, and optional third component and stirred at a temperature and for a time sufficient to adsorb the soluble complex on the tungsten oxide impregnated silica. Generally, the required contact between the soluble complex and the silica support takes places by mixing for a time in the range of from about 5 minutes to about 2 hours at a temperature in the range of from about 20° C. to about 100° C.

The solid produced by the contact of the silica support with the soluble complex is next contacted with an organoaluminum halide. The organoaluminum halide is selected from compounds having the general formula $AlR_nX_{3-n}$ wherein each R is individually selected from saturated and unsaturated hydrocarbon radicals containing 1 to 20 carbon atoms per radical, X is a halogen and n is a number equal to or between 1 and 2. Examples of such organoaluminum halides include methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-p-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like, and mixtures thereof. Ethylaluminum sesquichloride, ethylaluminum dichloride, and diethylaluminum chloride have been employed with good results. The most preferred organoaluminum halide is ethylaluminum sesquichloride.

The reaction with the organoaluminum halide can be carried out either in the presence of a liquid diluent or in the absence of such diluent. Preferably, the solid tungsten oxide containing silica impregnated with the reaction product of the metal dihalide, the transition metal compound and optionally, a third component, e.g., phenol, is contacted with a hydrocarbon solution of the organoaluminum halide. The temperature employed during the contact can vary over a broad range. Generally, the temperature employed is within the range of from about 0° C. to about 50° C. or higher with a temperature within the range of from about 20° C. to about 30° C. being most often employed. Heat is evolved when the contact takes place, and as a result, cooling may be necessary. The resulting slurry is stirred or agitated for a sufficient time, generally within the range of about 15 minutes to about 5 hours to insure that complete contact takes place. The resulting solid catalyst is recovered by filtration, decantation, or the like, and then washed with a suitable material such as n-pentane, n-heptane, cyclohexane, benzene, xylene or the like to remove any soluble material which may be present.

The mole ratio of the transition metal compound on the impregnated silica to the organoaluminum halide employed in the contact therewith can vary over a relatively broad range. Generally, the mole ratio of the transition metal to the organoaluminum halide is within the range of from 10:1 to 1:10, and more preferably within a range of about 2:1 to about 1:3.

The catalyst produced as described above can additionally be contacted and reacted with one or more activating agents, i.e., halide containing compounds of metals of groups IVA and VA of the Periodic Table. Examples of particularly preferred such halide ion exchanging activating agents are chlorine-containing compounds of silicon, germanium, tin, phosphorous, and carbon. Typical examples include carbon oxychloride, phosphorous trichloride, silicon tetrachloride, stannous chloride, carbon tetrachloride and acid chlorides of the formula R'COCl where R' is an aliphatic or aromatic radical, preferably containing 1 to 20 carbon atoms. Other suitable halogen-containing compounds include chlorosiloxanes, chlorinated silanes and the like. In a particularly preferred embodiment, a chlorine-containing silicon compound or an organosilane is employed in combination with titanium tetrachloride as the activating agent. Examples of silicon compounds include silicon tetrachloride, a chlorinated silane of the formula $SiHCl_3$ and chlorinated organosilanes of the formulas $\phi SiHCl_2$ and $\phi_2 SiCl_2$, wherein $\phi$ is a phenyl radical. Preferably, the catalyst produced after reaction with the organoaluminum halide as described above is contacted with an activating agent comprised of titanium tetrachloride and a silicon compound selected from silicon chloride, a chlorinated silane of the formula $SiHCl_3$ or a mixture of said silicon compounds. The reaction with the activating agent can be carried out in a liquid medium in which the activating agent components are soluble, e.g., a liquid hydrocarbon such as n-pentane, n-heptane, cyclohexane, benzene and xylene. Generally, the contact is carried out at a temperature in the range of from about 0° C. to about 200° C., preferably 100° C., for a time period in the range of from about 10 minutes to 10 hours. The weight ratio of the activating agent to the catalyst is generally within a range of about 10:1 to about 1:10 and usually from about 7:1 to about 1:4. Following the contact with the activating agent solution, excess solution is removed by washing the catalyst with additional solvent and storing the catalyst in the solvent or after drying, storing the catalyst under dry nitrogen.

In using the improved silica supported high activity catalyst of this invention for the polymerization of olefins, a cocatalyst of the organometallic type is preferably used in combination therewith. Suitable such organometallic cocatalysts include organoaluminum compounds, with the most preferred cocatalysts being organoaluminum compounds of the formula $R_3Al$ including, for example, trimethylaluminum, triethylaluminum, triisopropylaluminum, tridecylaluminum, triecosylaluminum, tricyclohexylaluminum, triphenylaluminum, and the like. Triethylaluminum is preferred since it has been found to produce excellent results. The mole ratio of the cocatalyst to the transition metal compound in the catalyst of this invention can vary over a relatively broad range. Generally, the mole ratio of the cocatalyst to the transition metal compound contained in the catalyst of the present invention is within a range of about 1:1 to about 1500:1.

The polymerization process using the catalysts of the present invention can be conducted in a liquid phase, in liquid monomer, in the presence or absence of inert hydrocarbon diluent or in a gas phase. The polymerization can be performed in a batch process or continuously. In a batch process, a stirred reactor is first purged with nitrogen and then with a hydrocarbon such as isobutane. A catalyst of the present invention and cocatalyst, if used, are charged to the reactor, and hydrogen if used, is added. A diluent such as isobutane is added to the reactor, and the reactor is heated to the desired reaction temperature, e.g., for ethylene a temperature within the range of about 50° C. to about 102° C. The monomer or monomers to be polymerized are then charged to the reactor and maintained at a partial pressure within the range of from about 0.5 MPa to about 5.0 MPa (70-725 psig). At the end of the reaction period, the reaction is terminated and unreacted monomer and isobutane are vented. The polymerized olefin product is collected as a free-flowing white solid, dried, etc. In a continuous process, a suitable reactor such as a loop reactor is continuously charged with diluent, catalyst, cocatalyst, polymerizable monomer and hydrogen, and polymerized product is continuously withdrawn and recovered.

The polymers produced using the catalyst of the present invention are generally characterized by high strength, uniformity of size and low level of residual catalyst. The polymers are produced in high productivity with low levels of fines.

In order to further illustrate the catalysts and methods of the present invention, the following example is given.

EXAMPLE

Tungsten oxide impregnated silica support was prepared using Davison Chemical Company silica grades 59 and 952. Davison grade 59 has a nominal surface area of about 340m$^2$/g as determined by the BET method and a pore volume of about 1.1 cc/g. Davison grade 952 silica has a nominal surface area of about 300 m$^2$/g and a pore volume of about 1.6 cc/g. An aqueous solution of ammonium metatungstate was added to each of the particulate silicas used in amounts resulting in the impregnation of the silicas with ammonium metatungstate in amounts of 3% or 6% by weight. After stirring, each of the impregnated particulate silicas was separated and dried in an air circulating oven at about 100° C. The dried impregnated silicas were then calcined in air at a temperature of 500° C. for 4 hours.

Particulate silica supported catalysts were prepared under argon in separate 1 quart (0.9 L) glass beverage bottles by charging particulate anhydrous magnesium dichloride thereto. The magnesium dichloride was hydrated by adding 0.04 moles of water and 300 ml of xylene to the anhydrous magnesium dichloride and stirring the mixture at room temperature over night (approximately 20 hours). To each bottle was then added 0.02 mole of titanium tetrabutoxide [Ti(OBu)$_4$] and 0.02 mole of phenol. While continuously stirring, each mixture was heated at 100° C. for about 1 hour to obtain a solution. To the hot solutions, quantities of particulate silica support with and without tungsten oxide were added, and the mixtures were stirred 10 to 15 minutes as they were allowed to cool to room temperature (about 23° C.). Each reaction mixture was then treated dropwise with 25 ml (0.01 mole) of ethylaluminum sesquichloride in a 25 weight percent solution of n-heptane which produced a solid that settled out quickly when the stirring was stopped. The solid compositions obtained are designated catalyst precursor A for convenience in the tables which follow. The solid compositions were separated by centrifugation, washed with n-hexane to remove unreacted components and dried by standing overnight in a dry argon atmosphere. A 5 g portion of each solid composition, i.e., of each precursor A, was activated by contact for 1 hour at 100° C. with about 25 ml of a mixture consisting of 50% by volume TiCl$_4$, 40% by volume SiHCl$_3$ and 10% by volume SiCl$_4$. The weight ratio of the activating agent mixture to the magnesium dichloride used in preparing the solid compositions ranged from about 8:1 to about 10:1. The activated solid compositions were isolated by suction filtration, washed with n-hexane and dried by standing overnight in a dry, argon atmosphere to obtain generally brownish-colored catalysts in the form of particulate solids. The weights of and types of supports employed in the catalysts, the weights of precursor A, the weights of the catalysts and the calculated weight percents of the catalyst components are set forth in Table 1 below.

Following each polymerization, the propylene in the reactor was recovered, stabilized with conventional antioxidants and dried. The polymer was tested for xylene and propylene solubles, melt flow in accordance with ASTM D1238, condition L and flexural modulus in accordance with ASTM D1505.

The xylene and propylene solubles test was performed by placing a 1 gram sample of polymer in a 100

TABLE 1

| Catalyst No. | Support Wt, g | Support Composition, Wt. % | Precursor A Wt, g | Isolated Catalyst[a] Wt, g | Calc. Wt. Support, g | Calc. Wt. % Support | Calc. Wt. % Cat |
|---|---|---|---|---|---|---|---|
| 1 | 20.0 | 100% 952 silica | 29.8 | 4.7 | 3.2 | 67 | 33 |
| 2 | 18.6 | 100% 59 silica | 28.2 | 4.7 | 3.1 | 66 | 34 |
| 3 | 7.4 | 6% WO$_3$/94% 59 silica | 14.5 | 5.0 | 2.6 | 51 | 49 |
| 4 | 20.0 | 3% WO$_3$/97% 952 silica | 30.1 | 4.9 | 3.3 | 66 | 34 |
| 5 | 20.0 | 6% WO$_3$/94% 952 silica | 29.7 | 4.6 | 3.1 | 67 | 33 |

[a]Based on 5.0 g of corresponding precursor A.

Catalysts 1, 3, 4 and 5 were analyzed for titanium, magnesium, aluminum, silicon, tin and chloride content by conventional means (Volhard titration for chloride and plasma emission for the metals). The percents by weight of the various metals and chlorine are given in Table 2 below.

TABLE 2

| Catalyst No. | Weight Percent[a] | | | | | |
|---|---|---|---|---|---|---|
| | Ti | Mg | Al | Si | Sn | Cl |
| 1 | 3.3 | 9.7 | 2.2 | 10.7 | 1.1 | 56.2 |
| 3 | 4.8 | 13.6 | 2.0 | 8.4 | 0.97 | 69.8 |
| 4 | 3.2 | 6.8 | 3.6 | 7.4 | 0.7 | 44.8 |
| 5 | 2.8 | 3.3 | 3.1 | 4.0 | 0.3 | 26.6 |

[a]Carbon, oxygen and hydrogen were not determined.

The analytical results set forth in Table 2 show appreciable variation in catalyst composition, particularly with respect to magnesium, silicon and chlorine content. However the titanium content was generally about 3 weight percent, except for catalyst 3 which approached 5 weight percent. As shown in Table 1, catalyst 3 was made in the presence of about ⅓ as much silica (7.4 g) as were catalysts 1, 2, 4 and 5 (about 20 g). This would account for the difference in titanium content.

Weighted portions of each supported catalyst were employed in propylene polymerizations. Each polymerization was carried out in a 1 L stirred, stainless steel reactor for 1 hour at 70° C. in liquid propylene. Each polymerization was conducted in the presence of 25 psi hydrogen and a cocatalyst consisting of 2.0 mmoles of triethylenealuminum premixed with 1.1 mmoles of ethylanisate and 2.0 mmoles of diethylaluminum chloride. The organo-metal solutions were each about 0.6 mole in n-heptane.

ml centrifuge tube containing 100 ml of xylene or propylene. The tube was then placed in a Heater-Evaporator and maintained at 140° C. for 15 minutes while stirring occasionally. After the 15 minute heating was completed, the tube was removed from the heater and allowed to cool at room temperature for 15 minutes, followed by cooling in an ice bath for 30 minutes. The tube was then placed in a centrifuge and centrifuged at approximately 1900 rpm for 15 minutes. The tube was removed from the centrifuge and 25 ml of the supernatant liquid was removed to an aluminum dish which had been previously weighed while empty. The dish containing the liquid was heated for 30 minutes, allowed to cool, and reweighed. The weight percent solubles was calculated according to the equation:

$$\% \text{ solubles} = \frac{4A \times 100}{S},$$

where
A = grams of polymer in aluminum dish, and
S = grams of original polymer sample. The results of these tests are given in Table 3 below.

TABLE 3

| Cat. No.[a] | Weight, Mg Supported Cat. | Weight, Mg Calc. Cat. | Calculated Productivity, g/g/hr Supported Cat. | Calculated Productivity, g/g/hr Calc. Cat. | Wt. % Solubles Propylene | Wt. % Solubles Xylene | Melt Flow g/10 min | Density g/cc | Flex Mod. MPa |
|---|---|---|---|---|---|---|---|---|---|
| 1 | 56.7 | 38.0 | 2020 | 3010 | 1.7 | 3.5 | 69 | 0.9027 | 1665 |
| 2 | 72.2 | 24.5 | 367 | 1080 | 4.7 | 3.3 | —[b] | — | — |
| 3[c] | 71.6 | 35.1 | 2490 | 6570 | 0.8 | 12 | 0.94 | 0.8989 | 877 |
| 3 | 55.3 | 27.1 | 2780 | 5680 | 0.3 | 5.2 | 31 | 0.9065 | 1300 |
| 4 | 61.5 | 20.9 | 2280 | 6720 | 2.0 | 6.1 | 51 | 0.9061 | 1479 |
| 5 | 74.2 | 24.5 | 1130 | 3420 | 4.2 | 7.5 | 100 | 0.9049 | 1390 |

[a]Catalysts 1 and 2 are comparisons. Catalyst 3–5 are invention catalysts.
[b]A blank signifies no determination made.
[c]No hydrogen used.

The silica support of catalyst 1 had a pore volume of about 1.6 cc/g whereas the silica support of catalyst 2 had a pore volume of about 1.1 cc/g. The productivity data relating to these two catalysts suggests that catalyst productivity increases as the pore volume of the silica support increases. Consequently, the effect of the catalysts of the present invention can best be assessed by comparison with catalysts employing the same silica. That is, control catalyst 1 is compared with invention catalyst 4 and 5 and control catalyst 2 is compared with invention catalyst 3.

The productivity of control support catalyst 1 is 2020 grams of propylene per gram of catalyst per hour and the total weight percent of solubles is 5.2. This is compared with invention catalyst 4 which has a productivity somewhat higher, i.e., 2280 grams of propylene per gram of catalyst per hour with about 8 weight percent total solubles formed. Based on the calculated active catalyst content, the productivity of invention catalyst 4 is more than double that obtained with control catalyst 1.

A comparison of control catalyst 2 and invention catalyst 3 shows that the invention catalyst has increased productivity by a factor of 5 to 7 times that of the control catalyst. In the absence of hydrogen, the productivity of the invention catalyst is increased even more, i.e., from 5680 grams of polymer per gram of catalyst per hour (hydrogen present) to 6570 grams of polymer per gram of catalyst per hour (hydrogen absent). However, the polymer made in the absence of hydrogen had a slightly lower density and substantially lower melt flow, flexural modulus and xylene-soluble values compared to its counterpart produced in the presence of hydrogen.

Thus, the present invention is well adapted to carry out the objects and obtain the ends and advantages mentioned as well as those inherent therein. While numerous substitutions of equivalent components and changes in the arrangement of steps may be made by those skilled in the art, such changes are encompassed within the spirit of this invention as defined by the appended claims.

We claim:

1. A method of producing an improved silica supported high activity olefin polymerization catalyst comprising:
   (a) preparing a particulate silica support impregnated with tungsten oxide;
   (b) contacting said support prepared in step (a) with the soluble complex produced by heating a mixture of a metal dihalide with at least one transition metal compound in the presence of a diluent to produce a solid, said support being present in an amount in the range of from about 0.1% to about 30% by weight based on the weight of said soluble complex; and
   (c) contacting said solid produced in step (b) with an organoaluminum halide in an amount in the range of from about 0.1 mole to about 10 moles per mole of transition metal compound in said solid to produce said catalyst.

2. The method of claim 1 wherein said silica support is impregnated with tungsten oxide in an amount in the range of from about 1% to about 20% by weight of the impregnated support.

3. The method of claim 1 wherein said metal dihalide is magnesium dichloride.

4. The method of claim 3 wherein said transition metal compound is a titanium alkoxide of the formula Ti(OR)$_4$ wherein each R is independently a hydrocarbyl radical containing in the range of from 1 to about 20 carbon atoms.

5. The method of claim 4 wherein said mixture of metal dihalide and transition metal compound is heated in the presence of a xylene diluent at a temperature in the range of from about 0° C. to about 50° C. for a time period in the range of from about 5 minutes to about 10 hours.

6. The method of claim 1 wherein the ratio of metal dihalide to transition metal compound in step (a) is in the range of from about 10:1 to about 1:10.

7. The method of claim 2 wherein said tungsten oxide impregnated silica support is prepared by mixing particulate silica with an aqueous solution of ammonium metatungstate, drying the mixture and then calcining the mixture.

8. The method of claim 1 wherein said soluble complex of step (b) is produced by heating a mixture of metal dihalide, at least one transitional metal compound and an aromatic compound in the presence of a diluent.

9. The method of claim 8 wherein said aromatic compound is phenol, said diluent is xylene and said heating is at a temperature in the range of from about 0° C. to about 50° C. for a time period in the range of from about 5 minutes to about 10 hours.

10. The method of claim 1 which is further characterized to include the additional step of contacting said catalyst with an activating agent selected from the group consisting of a titanium chloride, a silicon chloride, a chlorinated silane of the formula SiHCl$_3$ and mixtures of two or more of said compounds.

11. An olefin polymerization catalyst produced in accordance with the method of claim 1.

12. An olefin polymerization catalyst produced in accordance with the method of claim 2.

13. An olefin polymerization catalyst produced in accordance with the method of claim 5.

14. An olefin polymerization catalyst produced in accordance with the method of claim 7.

15. An olefin polymerization catalyst produced in accordance with the method of claim 9.

16. An olefin polymerization catalyst produced in accordance with the method of claim 10.

17. A method of polymerizing olefins comprising contacting at least one olefin under polymerization conditions with a catalyst produced by:
   (a) preparing a particulate silica support impregnated with tungsten oxide;
   (b) contacting said support prepared in step (a) with the soluble complex produced by heating a mixture of a metal dihalide with at least one transition metal compound in the presence of a diluent to produce a solid, said support being present in an amount in the range of from about 0.1% to about 30% by weight based on the weight of said soluble complex; and
   (c) contacting said solid produced in step (b) with an organoaluminum halide in an amount in the range of from about 0.1 mole to about 10 moles per mole of transition metal compound in said solid to produce said catalyst.

18. The method of claim 17 wherein said silica support is impregnated with tungsten oxide in an amount in the range of from about 1% to about 20% by weight of the impregnated support.

19. The method of claim 17 wherein said metal dihalide is magnesium dichloride.

20. The method of claim 19 wherein said transition metal compound is a titanium alkoxide of the formula Ti(OR)$_4$ wherein each R is independently a hydrocarbyl radical containing in the range of from 1 to about 20 carbon atoms.

21. The method of claim 20 wherein said mixture of metal dihalide and transition metal compound is heated in the presence of a xylene diluent at a temperature in the range of from about 0° C. to about 50° C. for a time period in the range of from about 5 minutes to about 10 hours.

22. The method of claim 17 wherein the ratio of metal dihalide to transition metal compound in step (a) is in the range of from about 10:1 to about 1:10.

23. The method of claim 18 wherein said tungsten oxide impregnated silica support is prepared by mixing particulate silica with an aqueous solution of ammonium metatungstate, drying the mixture and then calcining the mixture.

24. The method of claim 17 wherein said soluble complex of step (b) is produced by heating a mixture of metal dihalide, at least one transitional metal compound and an aromatic compound in the presence of a diluent.

25. The method of claim 24 wherein said aromatic compound is phenol, said diluent is xylene and said heating is at a temperature in the range of from about 0° C. to about 50° C. for a time period in the range of from about 5 minutes to about 10 hours.

26. The method of claim 17 which is further characterized to include the additional step of contacting said catalyst with an activating agent selected from the group consisting of a titanium halide, a silicon halide, a halogenated silane of the formula $SiHX_3$ wherein X is a halogen and mixtures of two or more of said compounds.

27. The method of claim 17 wherein said polymerizing is conducted with said catalyst and, in addition, a cocatalyst comprised of an organoaluminum compound.

28. The method of claim 27 wherein the organoaluminum compound is triethylaluminum, and said cocatalyst is present in a mole ratio of cocatalyst to transition metal compound of said catalyst in the range of from about 1:1 to about 1500:1.

* * * * *

UNITED STATES PATENT AND TRADEMARK OFFICE
CERTIFICATE OF CORRECTION

PATENT NO. : 5,091,490

DATED : February 25, 1992

INVENTOR(S) : Gil R. Hawley et al.

It is certified that error appears in the above-identified patent and that said Letters Patent is hereby corrected as shown below:

Column 2, line 55, after "catalyst" and before the
"." insert --therein--;

Column 3, line 63, after "sulfur" insert --atoms
being bonded to a carbon atom of a carbon-
containing--.

Signed and Sealed this

Thirteenth Day of April, 1993

Attest:

STEPHEN G. KUNIN

*Attesting Officer*  *Acting Commissioner of Patents and Trademarks*